A. E. WINCKLER.
ROTARY VALVE FOR EXPLOSIVE ENGINES.
APPLICATION FILED MAY 5, 1913.

1,175,897.

Patented Mar. 14, 1916.
6 SHEETS—SHEET 1.

UNITED STATES PATENT OFFICE.

AAGE E. WINCKLER, OF RACINE, WISCONSIN, ASSIGNOR, BY MESNE ASSIGNMENTS, TO J. I. CASE THRESHING MACHINE COMPANY, OF RACINE, WISCONSIN, A CORPORATION OF WISCONSIN.

ROTARY VALVE FOR EXPLOSIVE-ENGINES.

1,175,897.  Specification of Letters Patent.  Patented Mar. 14, 1916.

Application filed May 5, 1913. Serial No. 765,469.

*To all whom it may concern:*

Be it known that I, AAGE E. WINCKLER, a resident of Racine, in the county of Racine and State of Wisconsin, have invented certain new and useful Improvements in Rotary Valves for Explosive-Engines, of which the following is a full, clear, and exact description.

The invention relates to internal combustion engines.

The invention designs to provide a rotary valve in which provision is made for overcoming unequal pressure or stresses upon the different parts thereof, to cause the valve to work smoothly and without undue friction or wear.

The invention further designs to provide rotary-valve mechanism which may be readily adjusted to fit snugly in its seat, by relative adjustment of different parts of the valve, as exemplified by the two oppositely tapered conoidal portions fitting in correspondingly formed seats and which, by relative adjustment, will be caused to fit accurately in the seat. Resultantly, the necessity of providing presser-means for holding the tapered valve in its seat will be avoided, the oppositely tapered portions serving to mutually hold each other in accurately fitting relation to the seat.

The invention further designs to provide an improved rotary valve in which provision is made for admitting fluid under pressure to the non-working portions of the valve, to overcome irregular wear resulting in the conoidal seat, if the pressure of the fluid is exerted only at one side or portion thereof.

The invention further designs to provide a valve which may be efficiently lubricated.

Lastly, the invention designs to provide rotary valve-mechanism for explosive engines which is simple in construction and efficient in operation.

The invention consists in the several novel features hereinafter set forth and more particularly defined by claims at the conclusion hereof.

Figure 1:
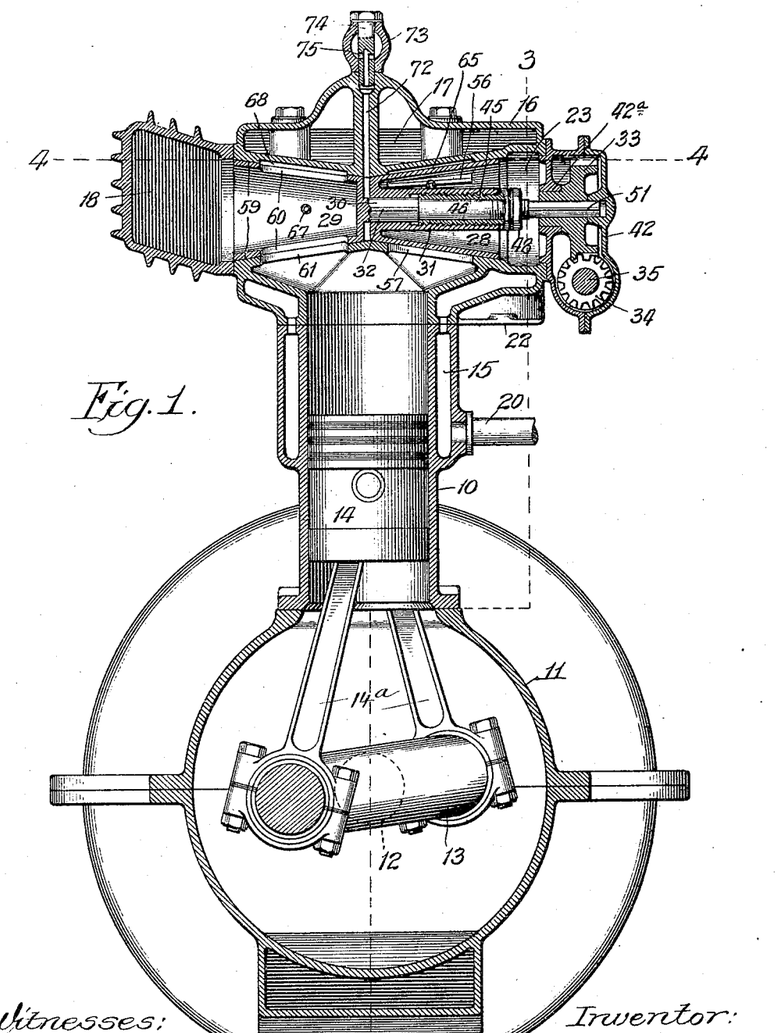
Figure 1 is a central vertical transverse section of an explosive engine embodying the invention.
Figure 2:
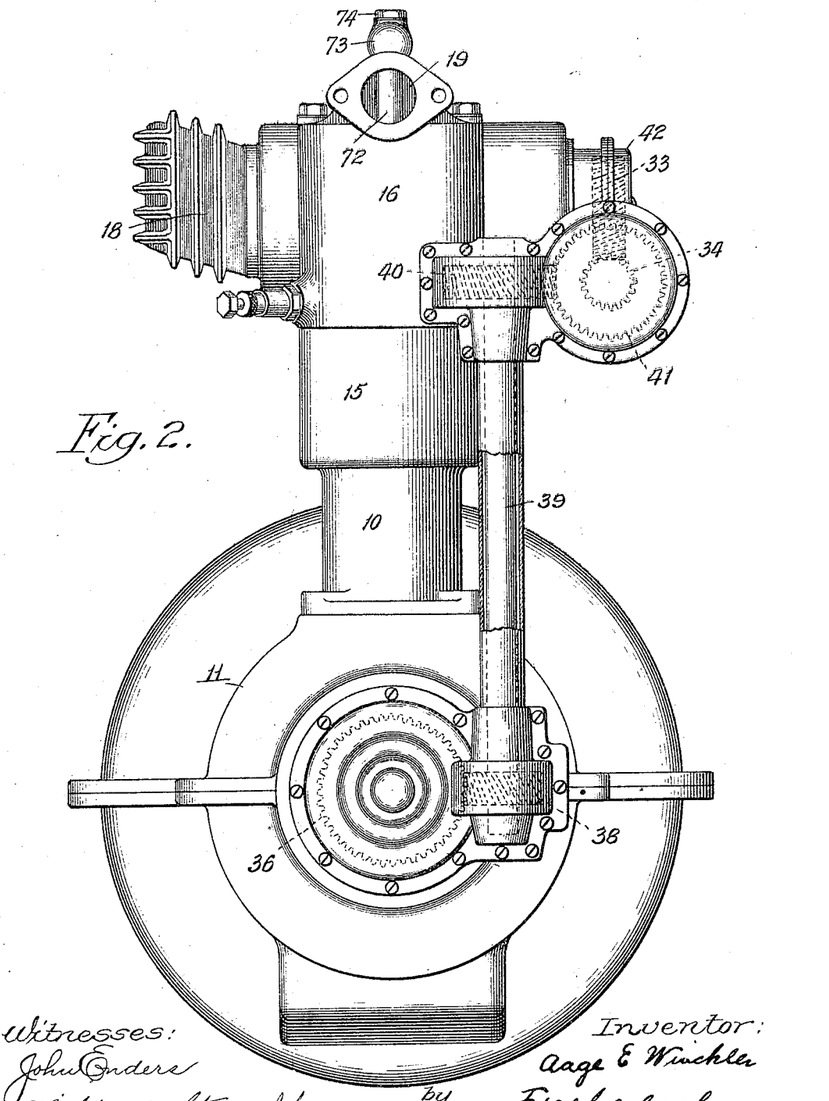
Fig. 2 is an end elevation.
Figure 3:
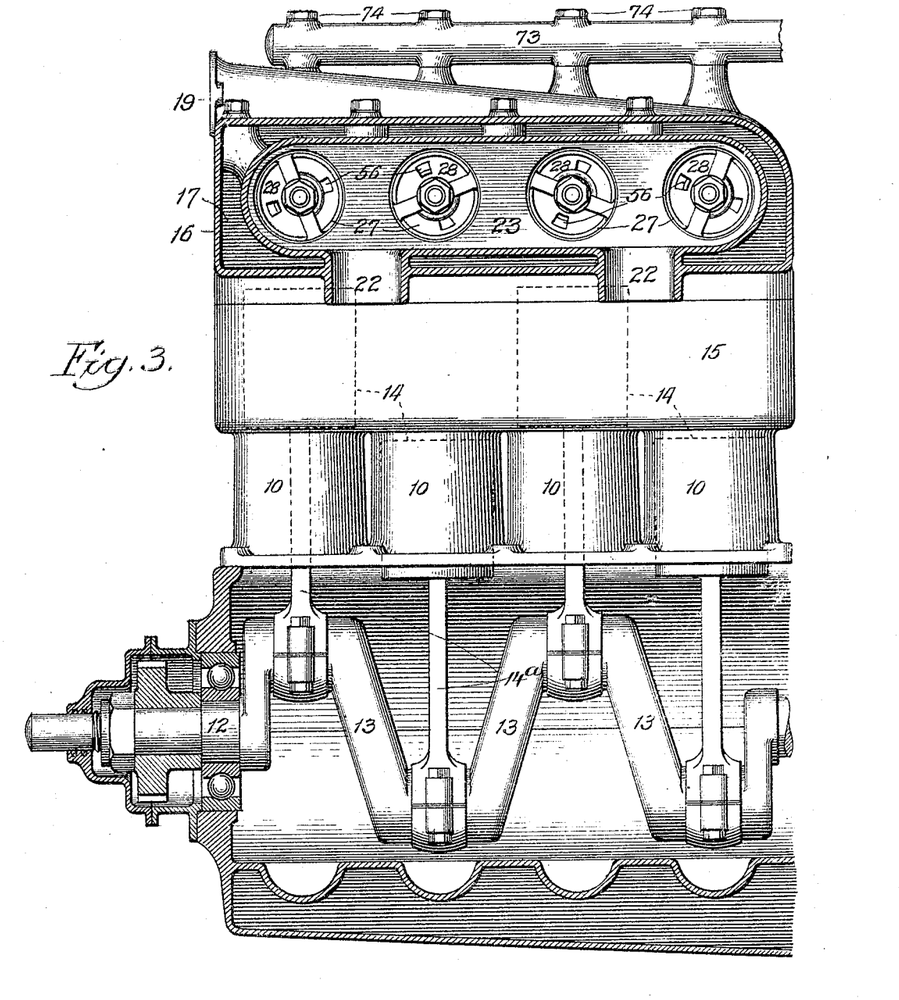
Fig. 3 is a vertical longitudinal section taken on line 3—3 of Fig. 1, the crank-case being shown in section.
Figure 4:
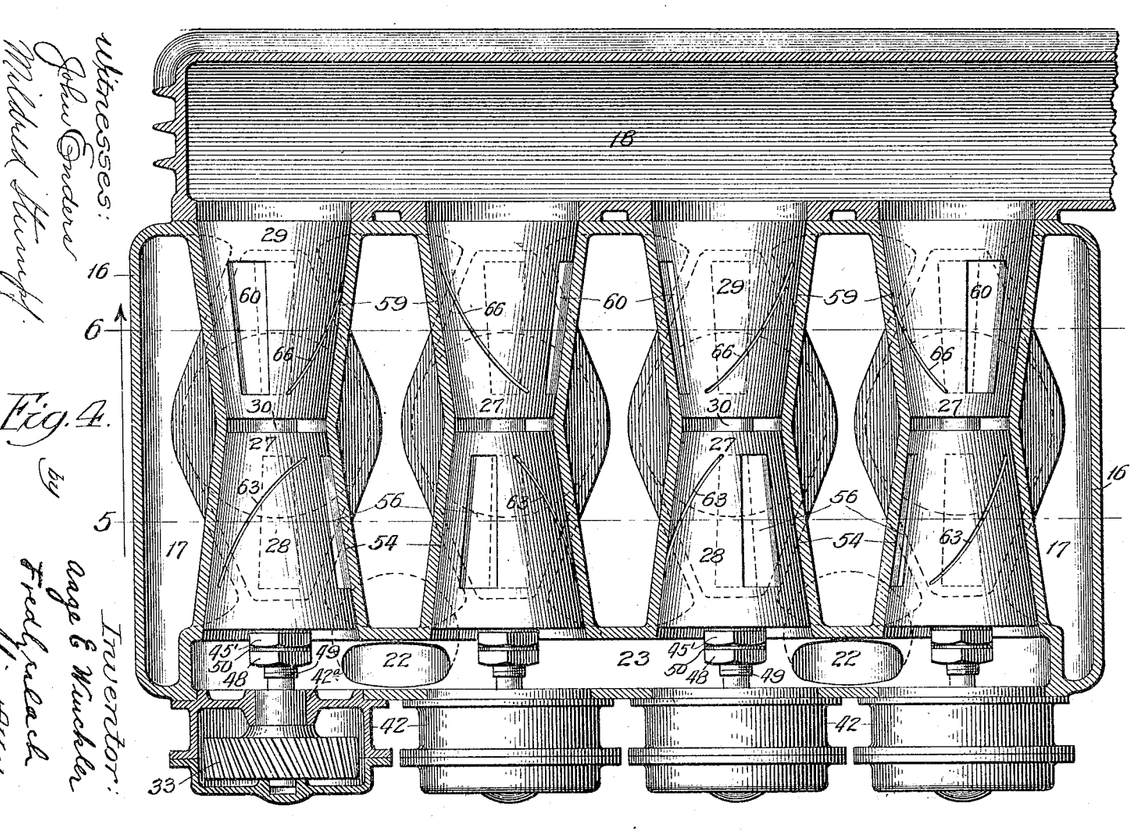
Fig. 4 is a horizontal section on line 4—4 of Fig. 1.
Figure 5:
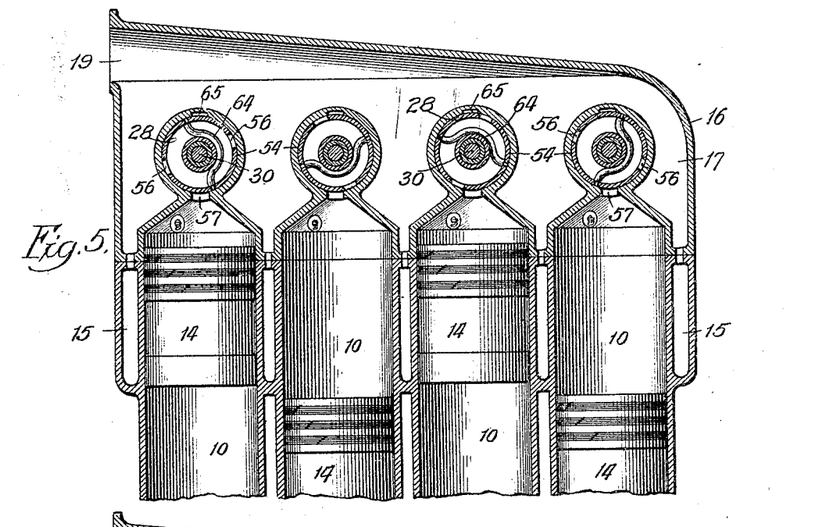
Fig. 5 is a section taken on line 5—5 of Fig. 4.
Figure 6:
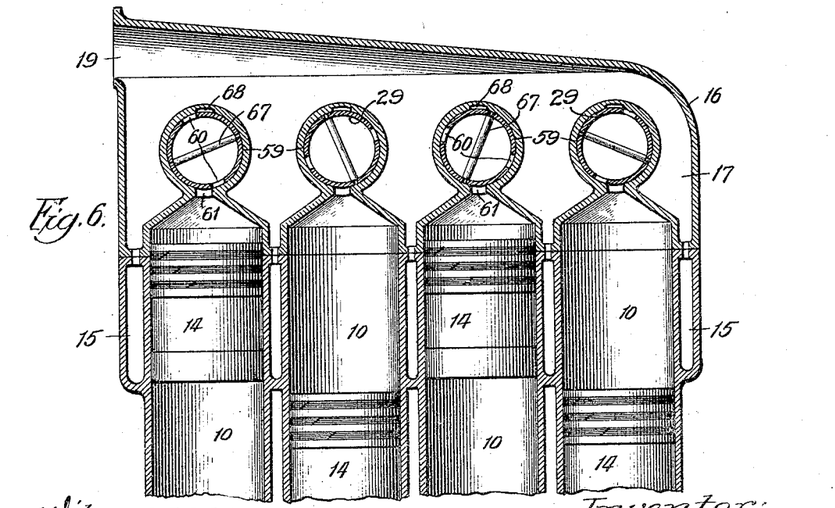
Fig. 6 is a section taken on line 6—6 of Fig. 4.
Figure 7:
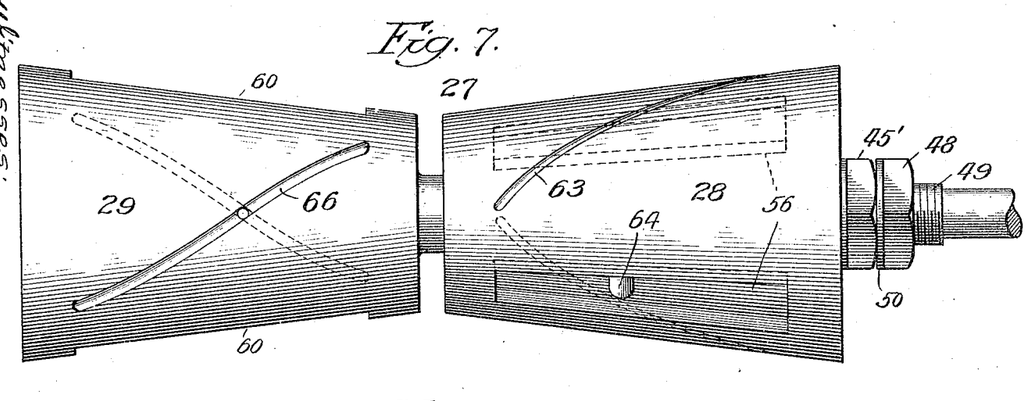
Fig. 7 is a detail plan of the rotary valve.
Figure 8:
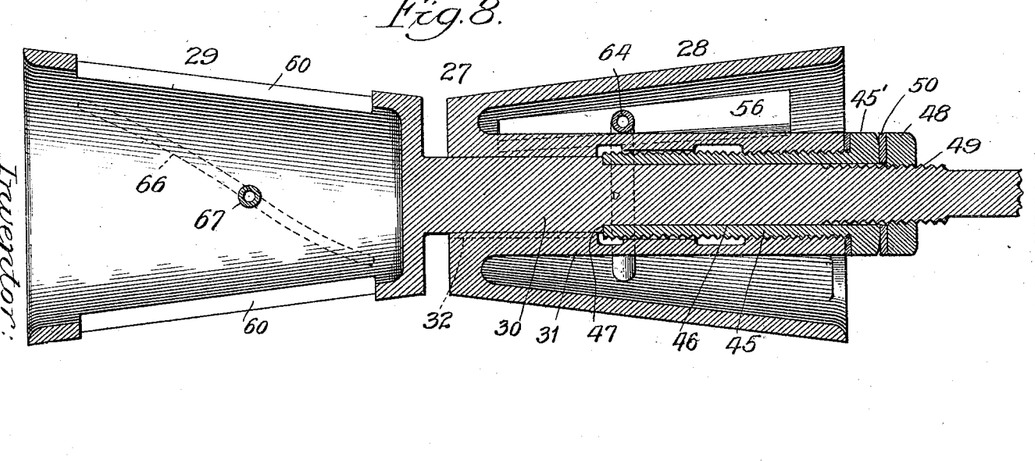
Fig. 8 is a section of said valve.

The invention is illustrated as applied to a four-cylinder engine, it being understood, however, that it may be applied to an engine comprising any desired number of cylinders.

The engine comprises cylinders 10 mounted upon a crank-case 11, a crank-shaft 12 suitably journaled in the crank-case, and cranks 13, connected to the sliding pistons 14 working in the cylinders, respectively by pitmen 14ª, all of which may be of any suitable or usual construction, as well understood in the art. A water-jacket 15 is provided around the cylinders which are illustrated as cast *en bloc*.

A combined cylinder-head and valve casing 16 is fitted and secured to the top of the engine-cylinders and this casing has formed therein a water-chamber 17 for cooling the head and the walls in which the valve-seats are formed. An exhaust manifold 18 is secured to one side of the casing 16. The water-jacket is provided with a water-inlet connection 20 and casing 16 is provided with an outlet-connection 19. Inlet-ducts 22 are formed at one side of casing 16 to deliver combustible fluid to a chamber 23 which supplies the fluid to the valve-mechanism. Valve-seats for the fluid-controlling valves, one for each cylinder, are formed in casing 16 as hereinafter more fully set forth.

A rotary valve is provided for each cylinder and these valves, as well as the seats therefor are of like construction, so that a description of one will suffice for all, it being understood that the operation of the valves will be properly timed to cause successive operation of the pistons.

The supply of combustible fluid to, and the exhaust of the products of combustion from, each cylinder 10 is controlled by a rotary-valve 27 which comprises two oppositely tapered conoidal hollow members 28 and 29, which are tapered toward the center thereof or flared outwardly from the center. Member 28, of this valve, controls the supply of combustible fluid to its cylinder and member 29 controls the exhaust of the products of combustion therefrom. The engine shown is of the four-cycle type.

A valve-stem 30 is formed on valve-member 29 and extends through a hub on valve-member 28, said hub being slidably connected to said stem by a key 32 which causes the valve-members to rotate together and with the stem, while permitting relative adjustment of said members. The valve-stem 30 is connected to suitable driving-mechanism, consisting of an oblique-toothed gear wheel 33 which is operatively connected to the outer end of said stem and an oblique-toothed pinion 34 on a valve-operating shaft 35. Said shaft 35 is constantly driven from crank-shaft 12 by mechanism comprising an oblique-toothed gear 36 on the crank-shaft, a similarly toothed pinion 38 meshing with gear 36 and secured to a vertical shaft 39 which has an oblique-toothed gear 40 at its upper end which meshes with an oblique-toothed gear 41 on the valve-operating shaft 35. The latter shaft serves to drive all of the valves 27, being provided with a pinion 34 for each valve. Each gear-wheel 33 is journaled in a suitable gear-case 42 which is also provided with a bearing for the outer end of valve-stem 30, a bearing 42ª for the hub of gear 33, and bearings for shaft 35. The gearing for driving valve-operating shaft 35 may also be inclosed, as shown. The gearing drives shaft 35 in the ratio of 4 to 1 from the crank-shaft. Each case 42 is formed of sections removably secured together and is secured in casing 16 at one side thereof.

Relative adjustment of valve-members 28 and 29 may be positively effected by a sleeve 45 which is held on a reduced portion 46 of valve-stem 30 and against longitudinal movement thereon by a shoulder 47 on the stem and a nut 48 which engages a correspondingly-threaded portion 49 on the valve-stem 30. A lock-washer 50 is interposed between nut 48 and the adjusting sleeve 45, and the latter has an external screw-thread engaging an internal-thread in hub 31 of valve-member 28. To relatively adjust the valve-members, sleeve 45 will be rotated, being provided with a hexagonal portion 45′ for application to a turning tool. When the sleeve is turned, its screw-threaded engagement with hub 31, which is held against rotation on the stem by key 32, will cause longitudinal movement of member 28 on the stem. This sleeve serves to positively adjust the valve-member relatively to each other, in either direction, according to the direction in which the nut is turned. Nut 48 may be tightened to lock the sleeve 45 against displacement and may be loosened to permit the sleeve to be turned when the valve is to be adjusted.

Gear 33 is operatively connected to rotate stem 30 by a key and way 51 which permits the gear-wheel to be disconnected from said stem when adjustment of the valve is necessary. This connection also avoids any lateral pressure upon the valve. When the gear-case 42 and gear 33 are removed, the adjusting-devices for the rotary-valves will be accessible through the chamber 23, in casing 16 adjacent the gear-case. This adjusting-device for the oppositely and inwardly tapered valve-members, exemplifies means for relatively adjusting them to cause them to be snugly seated in their respective seats and to mutually hold each other in engagement with their seats and to provide effective contact against the escape of fluid and to avoid the necessity of independent means for pressing the tapered valve to its seat.

The valve-seat 54 for the intake valve-member 28 is tapered inwardly correspondingly to the taper on valve-member, so that said member will fit accurately in the seat. Chamber 23 at the outer end of valve-seat 54 supplies combustible fluid into valve-member 28, the outer end of the latter being open. Each valve-member 28 is formed with two oppositely disposed ports 56 which in rotative succession are brought into registry with an opening 57 between the valve-seat 54 and the combustion-chamber at the upper end of the cylinder. When one of the ports 56 is brought into registry with opening 57, combustible fluid for the operation of the piston, will pass into the cylinder, being drawn thereinto during the intake stroke of the piston, at which time the exhaust-valve will be closed.

Each valve-member 29 which controls the exhaust, fits in an inwardly tapered conoidal seat 59 corresponding to the taper of said member and is formed with a pair of oppositely disposed ports 60 which in rotative succession are alternately brought into registry with an opening 61 between valve-seat 59 and the combustion-chamber at the upper end of the cylinder, and by means thereof, the products of combustion will, during the scavenging stroke of the piston, be expelled through the hollow valve-member 29 into the exhaust manifold 18. It will be understood that the valves 27 will be operated in properly timed succession to successively drive the several pistons in the cylinder.

As a result of providing a valve with oppositely and inwardly tapered or conoidal portions, relative adjustment of the valve-portions, relative adjustment of the valve-members or oppositely tapered portions, no holding-means, other than the valve, itself, is necessary to keeping the valve-members in effective contact without undue friction, the opposite tapered members serving to mutually hold the valve properly seated. By adjustment of sleeve 45, any wear between the valve-surfaces and seats may be effectively taken up to insure effective fit of the valve-members in their seats.

To avoid uneven wear upon the seats, such as results from upward pressure against the bottom portion either of the valve-members when the fluid in the cylinder is under high pressure, during the power stroke and the compression stroke, provision is made for conducting fluid of equal pressure to that in the cylinder, to pockets between the upper portion of the valve-members and their seats. For this purpose, the periphery of the intake-valve is provided with oppositely disposed diagonal grooves 63 which alternately receive fluid from the cylinder during the power and compression strokes of the piston through opening 57, and are cross-connected by a pipe 64, to conduct fluid to a recess 65 formed in the valve-seat 54 and of the same superficial area as opening 57 or the exposed area of valve-member 28 when it is closed. Resultantly, when valve-member 28 is closed, and there is pressure in the cylinder, fluid will pass via opening 57, groove 63, pipe 64 and the opposite groove 63 to recess 65 to exert a counter-pressure on the top of the valve and balance the pressure of fluid against that portion of valve-member 28 which is exposed to pressure in the cylinder. The purpose of forming grooves 63 diagonally across the periphery of valve-member 28 is to avoid uneven wear in the valve-seat 54, such as would result from a narrow circumferential groove, which would leave a ridge in the seat. For the same purpose, diagonal grooves 66 are formed on the opposite sides of valve-member 29, between ports 60 and a pipe 67 cross-connects these grooves. Valve-seat 59 is formed with a recess 68 of substantially the same area as opening 61, so that fluid under the same pressure as in the cylinder will always be present in said recess, to counter-balance the pressure upon the top and bottom of the valve during the compression and power strokes. These devices thus exemplify means for equalizing fluid-pressure upon opposite sides of both the intake and exhaust members of the valve, so that the valve-seat will not be unevenly worn as the result of pressure against that portion which is exposed to fluid-pressure in the cylinder.

An oil-duct 72 is formed in casing 16 for each of the valves 27 and these ducts communicate with and receive oil from a lubricant-manifold 73 which is secured to the top of casing 16 by bolts 74 which are screwed into the top of said casing. Grooves 75 are formed in each bolt to permit oil to pass from said manifold into one of the ducts 72. Each of said ducts conducts the lubricant to the reduced or central portion of a valve 27, and this feature is advantageous, because the greater surface speed of the larger ends of the outer ends of the valve cause the oil to be fed outwardly and thus cause all of the working surfaces of the valve to be properly lubricated.

In operation, the rotary-valves 27, will be continuously driven from the crank-shaft and each in its turn will admit combustible fluid from chamber 23 to one of the cylinders. During the compression-stroke of the piston valve-member 28 will be closed and during the compression-stroke, the exhaust-valve will also be closed. After combustion produced in the cylinder by the usual ignition means, such as spark-plug $x$, the exhaust-valve member 29 will be opened to permit the products of combustion to pass from the cylinder to the exhaust-manifold. At all times, when either valve-member is closed and there is fluid under pressure in the cylinder, some of such fluid will pass to the upper side of the valve to balance the pressure upon the valve.

The invention thus exemplifies an improved rotary valve which has adjustable opposing tapered surfaces and coöperating seats, whereby effective working contact, without unnecessary friction, will be efficiently maintained and without providing means for pressing the tapered valve against its tapered seat; also means for balancing the pressure upon the rotary valve, and means for preventing uneven wear of the seat.

The invention is not to be restricted to the details set forth, since these may be modified within the scope of the appended claims, without departing from the spirit and scope of the invention.

Having thus described the invention, what I claim as new and desire to secure by Letters Patent is:

1. In an internal combustion engine, the combination with a piston, a cylinder and a combustible fuel supply, of a fluid-controlling rotary valve having oppositely tapered members, a correspondingly tapered seat for said valve, means for relatively adjusting said members, disposed outwardly of one of the valve-members and accessible to effect said relative adjustment when the valve members are in the seat, and mechanism for rotating said valve.

2. In an internal combustion engine, the combination with a piston, a cylinder and a combustible fuel-supply, of a fluid-controlling rotary valve having oppositely and inwardly tapered members, a correspondingly tapered seat for said valve, means for relatively adjusting said members, disposed outwardly of one of the members and accessible to effect said relative adjustment when the valve members are in the seat.

3. In an internal combustion engine, the combination with a piston, a cylinder and a combustible fuel supply, of a fluid-controlling rotary valve having oppositely and inwardly tapered members, a correspondingly tapered seat for said valve, means for relatively adjusting said members, disposed outwardly of one of the members and accessible to effect said relative adjustment when the valve members are in the seat, locking-means for said adjusting means, similarly disposed and accessible, and mechanism for rotating said valve.

4. In an internal combustion engine, the combination with a piston, a cylinder and a combustible fuel supply, of a fluid-controlling rotary valve having oppositely and inwardly tapered members, a correspondingly tapered seat for said valve, one of said members being hollow and having a stem projecting from its inner end into the other member of the valve, the latter having a sleeve therein secured on said stem, and mechanism for rotating said valve.

5. In an internal combustion engine, the combination with a piston, and a combustible fuel-supply, of a fluid-controlling rotary valve having oppositely tapered members each having its inner end closed and its outer end open, a correspondingly tapered seat for said valve, a slidable connection between said members, a device for relatively adjusting and locking said members together, disposed at the outer end of one of said members and accessible while the valve is in its seat and mechanism for rotating said valve.

6. In an internal combustion engine, the combination with a piston, a cylinder, and a combustible fuel supply, of a fluid-controlling rotary valve having oppositely and inwardly inclined conoidal members each having its inner end closed and its outer end open, a correspondingly tapered seat for said members, a slidable connection between said members, a device for relatively adjusting and locking said members, disposed at the outer end of one of the members and accessible while the valve is in its seat and mechanism for rotating said valve.

7. In an internal combustion engine, the combination with a piston, a cylinder, and a combustible fuel-supply, a fluid-controlling rotary valve having oppositely tapered conoidal surfaces, a correspondingly tapered seat for said valve, a stem on one of said members, a hub on the other member slidable on the stem, a screw-sleeve between the hub and the stem; means for relatively adjusting said members, and mechanism for rotating said valve.

8. In an internal combustion engine, the combination with a piston, a cylinder and a combustible fuel-supply, of a fluid-controlling rotary-valve having oppositely and inwardly inclined conoidal members, a correspondingly tapered seat for said valve, a stem on one of said members, a hub on the other member slidable and non-rotatable on the stem, a screw-sleeve between the hub and the stem, for relatively adjusting said members, a nut for locking said sleeve on the stem, and mechanism for rotating said valve.

9. In an internal combustion engine, the combination with a piston, a cylinder and a combustible fuel-supply, of a fluid-controlling rotary valve having oppositely and inwardly tapered conoidal members each having a closed wall at its inner end and its outer end open, a correspondingly tapered seat for said valve, a stem on the inner wall of one of said members extending through and slidable in the inner wall of the other member, a screw-sleeve on the stem and between the stem and the other member for relatively adjusting said members, and mechanism for rotating said valve.

10. In an internal combustion engine, the combination with a piston, a cylinder and a combustible fuel-supply, of a rotary valve having oppositely tapered conoidal members each having a closed inner wall and its outer end open, a correspondingly tapered seat for said valve, one of said members having means disposed outside the inner wall thereof for controlling the supply of fluid to the cylinder, the other having means disposed outside the inner wall thereof for controlling the exhaust from the cylinder, means for relatively adjusting and locking said members accessible when the valve is in its seat, and mechanism for rotating said valve.

11. In an internal combustion engine, the combination with a piston, a cylinder and a combustible fuel-supply, of a rotary valve having oppositely and inwardly tapered conoidal members each having a closed inner wall and its outer end open, a correspondingly tapered seat for said valve, one of said members having a port disposed outside the inner wall thereof for controlling the supply of fluid to the cylinder, the other having a port disposed outside the inner wall thereof for controlling the exhaust from the cylinder, means for relatively adjusting and locking said members, disposed adjacent the outer end of the member having the inlet part therein, and mechanism for rotating said valve.

12. In an internal combustion engine, the combination with a piston, a cylinder and a combustible fuel-supply, of a fluid-controlling rotary valve, a seat for said valve, the seat having a port therein for the passage of fluid, the valve having a port therein, means in the valve for conducting fluid under pressure into contact with that side of the valve which is opposite the seat-port to balance the pressure upon the valve, and mechanism for rotating said valve.

13. In an internal combustion engine, the combination with a piston, a cylinder and a combustible fuel supply, of a fluid-controlling tapered rotary valve, a seat for said valve, the seat having a port therein for the passage of fluid, the valve having a port therein, means in the valve for conducting fluid under pressure into contact with that side of the valve which is opposite the seat port to balance the pressure upon the valve, and mechanism for rotating said valve.

14. In an internal combustion engine, the combination with a piston, a cylinder, and a combustible fuel-supply, of a fluid-controlling rotary valve having oppositely tapered surfaces, a correspondingly tapered seat having ports therein controlled by said valve, means in the valve for conducting fluid under pressure from the cylinder into contact with that side of the valve which is opposite said ports and mechanism for rotating said valve.

15. In an internal combustion engine, the combination with a piston, a cylinder, and a combustible fuel-supply, of a tapered rotary valve having a port therein, a correspondingly tapered seat for said valve having a port therein at one side of the valve and a recess at the opposite side thereof, means in the valve for conducting fluid under pressure from the cylinder into contact with said recess and into contact with the valve, when said port in the seat is closed by said valve and mechanism for rotating said valve.

16. In an internal combustion engine, the combination with a piston, a cylinder, and a combustible fuel-supply, of a tapered rotary valve having a port therein, a correspondingly-tapered seat for said valve having a fluid port therein at one side of the valve and a recess at the opposite side thereof, means for conducting fluid under pressure from the cylinder to said recess when said port in the seat is closed, comprising a diagonal groove in the periphery of the valve, and mechanism for rotating said valve.

17. In an internal combustion engine, the combination with a piston, a cylinder, and a combustible fuel-supply, of a tapered rotary valve having a port therein, a correspondingly tapered seat for said valve having a port therein at one side of the valve and a recess at the opposite side thereof, means in the valve for conducting fluid under pressure from the cylinder to said recess when said port in the seat is closed, comprising a duct extending from one side of the valve to the other, and mechanism for rotating said valve.

18. In an internal combustion engine, the combination with a piston, a cylinder, and a combustible fuel supply, of a tapered rotary valve having a port therein, a correspondingly tapered seat for said valve having a port therein at one side of the valve and a recess at the opposite side thereof, means for conducting fluid under pressure from the cylinder to said recess when said port in the seat is closed, comprising a diagonal groove in the periphery of the valve and a duct for conducting fluid from one side of the valve to said recess, and mechanism for rotating said valve.

19. In an internal combustion engine, the combination with a piston, a cylinder, and a combustible fuel supply, of a tapered rotary valve having a port therein, a correspondingly tapered seat for said valve having a port therein at one side of the valve and a recess at the opposite side thereof, means for conducting fluid under pressure from the cylinder to said recess when said port in the seat is closed, comprising a pair of oppositely disposed grooves in the periphery of the valve, and a duct between said grooves and mechanism for rotating said valve.

20. In an internal combustion engine, the combination with a piston, a cylinder and a combustible fuel-supply, of a tapered rotary valve having a port therein, a correspondingly tapered seat for said valve having a port therein at one side of the valve and a recess at the opposite side thereof, means for conducting fluid under pressure from the cylinder to said recess when said port in the seat is closed, comprising a pair of diagonal oppositely disposed grooves in the periphery of the valve, a duct between said groove, and mechanism for rotating said valve.

21. In an internal combustion engine, the combination with a piston, a cylinder and a combustible fuel supply, a fluid-controlling rotary valve having oppositely tapered conoidal surfaces, a correspondingly tapered seat for the valve having ports therein, and recesses in the opposite side thereof, means in and extending transversely through the valve for conducting fluid under pressure from the cylinder to said recesses when the seat-ports are closed and mechanism for rotating said valve.

22. In an internal combustion engine, the combination with a piston, a cylinder and a combustible fuel-supply, of a fluid-controlling rotary-valve having oppositely and inwardly tapered surfaces and having both of its ends open, a correspondingly tapered seat for said valve, means for relatively adjusting said surfaces, and mechanism for rotating said valve.

23. In an internal combustion engine, the combination with a piston, a cylinder and a combustible fuel-supply, of a fluid controlling rotary valve having oppositely and inwardly tapered hollow open-ended conoidal members, a correspondingly tapered seat for said valve, a stem on one of said members, a sliding connection between said stem and the other of said members, means for relatively adjusting said members, comprising a screw and a sleeve, and mechanism for rotating said valve.

24. In an internal combustion engine, the combination with a piston, a cylinder, and a combustible fuel-supply, of a tapered hollow open-ended rotary valve having a port therein, a correspondingly tapered seat for said valve having a port therein at one side of the valve, and a recess at the opposite side thereof, means for conducting fluid under pressure from the cylinder to said recess when said port in the seat is closed by said valve comprising a duct extending through said valve, and mechanism for rotating said valve.

AAGE E. WINCKLER.

Witnesses:
 FRED GERLACH,
 MILDRED STUMPF.